May 1, 1951     C. F. O'BRIEN     2,551,333
IMPLEMENT LIFT AND DEPTH GAUGE MECHANISM
FOR TRACTOR CULTIVATORS

Filed Sept. 17, 1948     2 Sheets—Sheet 1

Inventor

Charles F. O'Brien

By *Clarence A. O'Brien and Harvey B. Jacobson*
Attorneys

Patented May 1, 1951

2,551,333

UNITED STATES PATENT OFFICE 2,551,333

IMPLEMENT LIFT AND DEPTH GAUGE MECHANISM FOR TRACTOR CULTIVATORS

Charles F. O'Brien, Huntington, N. Y.

Application September 17, 1948, Serial No. 49,782

6 Claims. (Cl. 97—59)

My invention relates to improvements in implement lifting and depth gauging mechanism for tractor cultivators of the garden type guided by a walking attendant.

In such cultivators, a trailing cultivator implement carrying frame is swingable vertically about the axis of a pair of traction wheels, by means of the usual handle bars, to vary the working depth of the cultivator implements and to raise the same out of the ground for turning of the tractor cultivator or travel to and from different locations.

The primary object of my invention is to provide mechanism of simple form and inexpensive construction for holding the cultivator implement carrying frame in upswung position with the cultivator implements out of the ground and which is adapted to automatically and releasably lock said frame in that position, whereby the cultivator may be easily and quickly conditioned for travel with the cultivator implements out of the ground by momentarily lifting the handle bars, and the hands of the attendant need not be removed from the handle bars.

Another object is to provide mechanism of the character and for the purpose set forth which is easy to release by a slight pressure against a part of the same and then permits the cultivator implement carrying frame to quickly descend, under the influence of gravity, to engage the cultivator implements with the ground.

Still another object is to provide in mechanism for the purpose set forth, efficient devices of simple form for varying the descent of the cultivator implement carrying frame in different degree to variably gauge the depth at which the cultivator implements will work.

Still another object is to provide mechanism for accomplishing the objectives set forth adapted for easy quick application to conventional tractor garden cultivators without requiring any alteration in the basic structure of the cultivator.

Other and subordinate objects, within the purview of my invention, together with the precise nature of my improvements will be readily understood when the succeeding description and claims are read with reference to the drawings accompanying and forming part of this specification.

Figure 1:
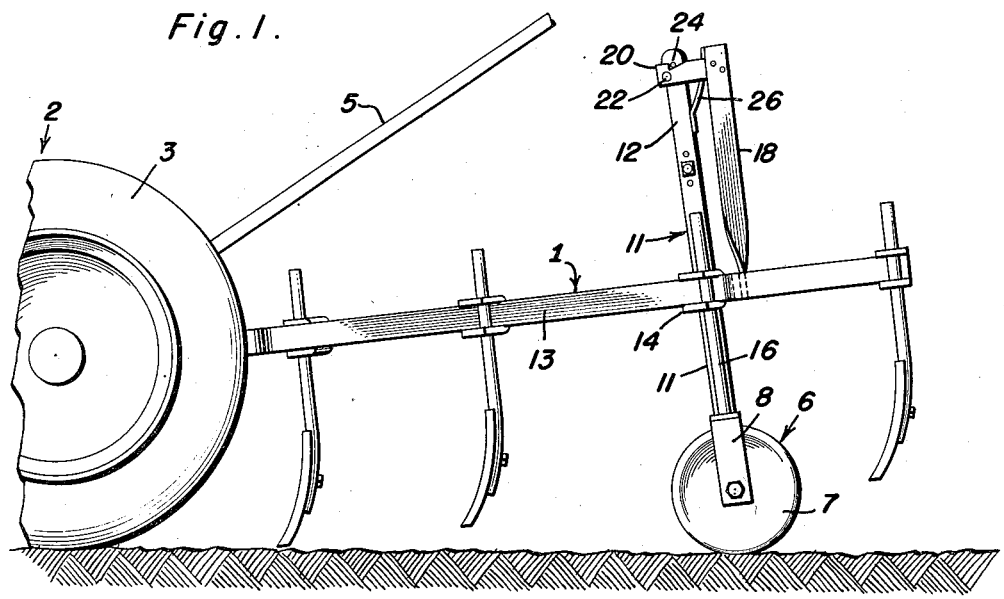
Figure 1 is a fragmentary view in side elevation, partly in section, illustrating the cultivator implement carrying frame equipped according to my invention in a preferred embodiment thereof, with the frame swung upwardly into position to withdraw the cultivator implements out of the ground, and said frame locked in upswung position.

Referring now to the drawings by numerals, 1 designates the usual trailing V-shaped cultivator implement carrying frame of the conventional tractor garden cultivator with which my invention is concerned, and which is detachably attached in a manner which will be understood, to the tractor unit, represented conventionally at 2, for vertical swinging about the axis of the ground wheels, one of which is shown at 3, to raise the cultivator implements 4 out of the ground and permit said implements to enter the ground. The numeral 5 designates one of the usual handle bars for such cultivators by means of which an attendant guides the cultivator and swings said frame 1 upwardly.

According to my invention, a wheeled truck 6 is provided for supporting the cultivator implement carrying frame 1 comprising a pair of ground wheels 7 at opposite sides of said frame 1 adjacent the rear end thereof and which are suitably mounted in fork members 8 attached, as at 9, to a tie bar 10 extending transversely of said frame.

A round center post 11 with a flattened upper end 12 and which is suitably fixed to said bar 10 rises from said bar intermediate the sides 13 of said frame 1 and is slidably fitted in and extended through a U-shaped guide plate 14 suitably secured to a transverse bar 15 adjacent the rear of said frame 1 and forming part of said frame.

A pair of end posts 16 rising from the tie bar 10 are slidably extended through guide plates 17, like the guide plate 14, and suitably fixed to the cultivator implement carrying frame 1 at opposite sides 13 thereof.

As will now be clear, the cultivator implement carrying frame 1 and the truck 6 are slidably connected for vertical swinging of said frame relative to said truck to withdraw the cultivator implements 4 out of the ground and for descent of said frame on said truck to enter said implements in the ground. For a reason presently clear, the posts 11, 16 have a sufficient degree of play longitudinally of the frame 1 in slots 14', 17' in the guide plates 14, 17 to permit a limited degree of forward and rearward tilting of the center post 11 relative to the cultivator implement carrying frame 1.

The means for automatically locking the cultivator implement carrying frame in upswung position will now be described. A hanger bar 18, preferably of inverted V-shape, for suspending the cultivator implement carrying frame 1 on the center post 11 rises from and is suitably fixed, as at 19, to the transverse bar 15 in the rear of the center post 11. A U-shaped guide member 20 for the flattened end 12 of the center post 11 extends forwardly from the upper end of the hanger bar 18 in straddling relation to said upper end 12 and is rigidly fixed, as at 21, to said bar 18. A locking cross pin 22 in the front end of the guide member 20 is arranged to enter an upwardly and rearwardly inclined front edge locking notch 23 in the flattened end 12 of the center post 11 when said post is tilted forwardly in said guide member 20. A transverse stop pin 24 in the flattened end 12 of the center post 11 is arranged to enter a pair of downwardly and forwardly inclined notches 25 in the upper edges of said guide member 20 when the cultivator implement carrying frame 1 is swung upwardly sufficiently to withdraw the cultivator implements 4 out of the ground, said pin 24 and notches 25 establishing the limit of upward swinging of said frame 1. An upright leaf spring 26 is suitably secured at one end to the rear edge of the flattened upper end 12 of the center post 11 to enter the guide member 20 and bear against the hanger bar 18 as said frame 1 nears its limit of upward swinging movement and acts to tilt said center post 11 forwardly.

A series of vertically spaced bolt holes 27 in the flattened end 12 of the center post 11, below the notches 23 provides for inserting a stop bolt 28 in said post at selected heights from the ground for engagement by the guide member 20 when the cultivator implement carrying frame 1 swings downwardly whereby to variably gauge the depth at which the cultivator implements 4 may work in the ground.

Figure 2:
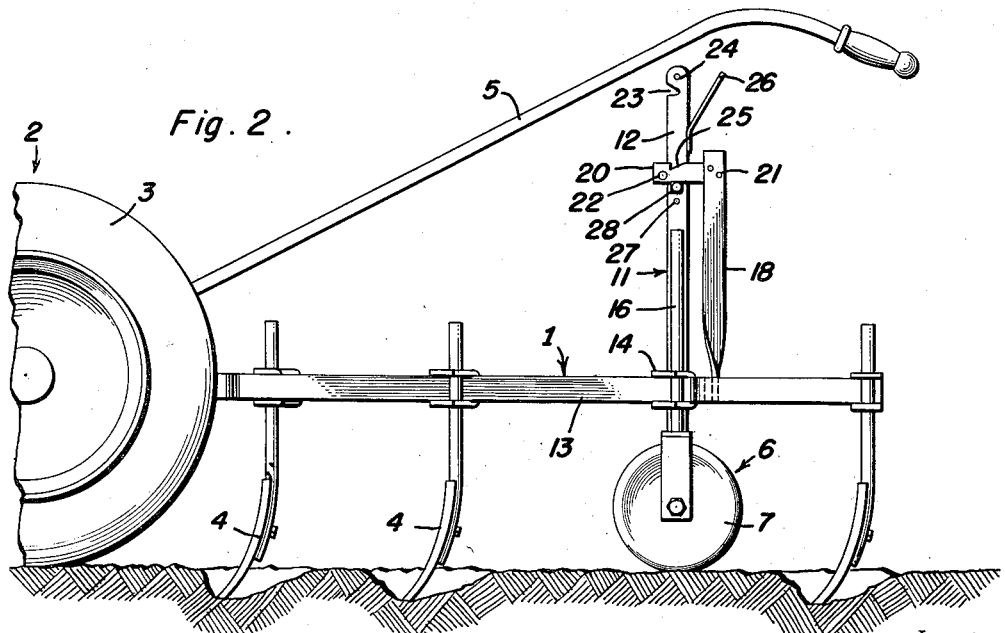
Figure 2 is a similar view with the cultivator implement carrying frame unlocked and lowered into position for working of the cultivator implements in the ground to a depth established by the depth gauging devices of the invention.
Figure 4:
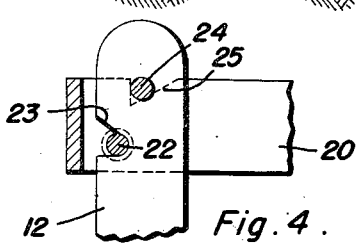
Figure 4 is a fragmentary view in side elevation, partly in transverse section, of the automatic locking devices.
Figure 3:
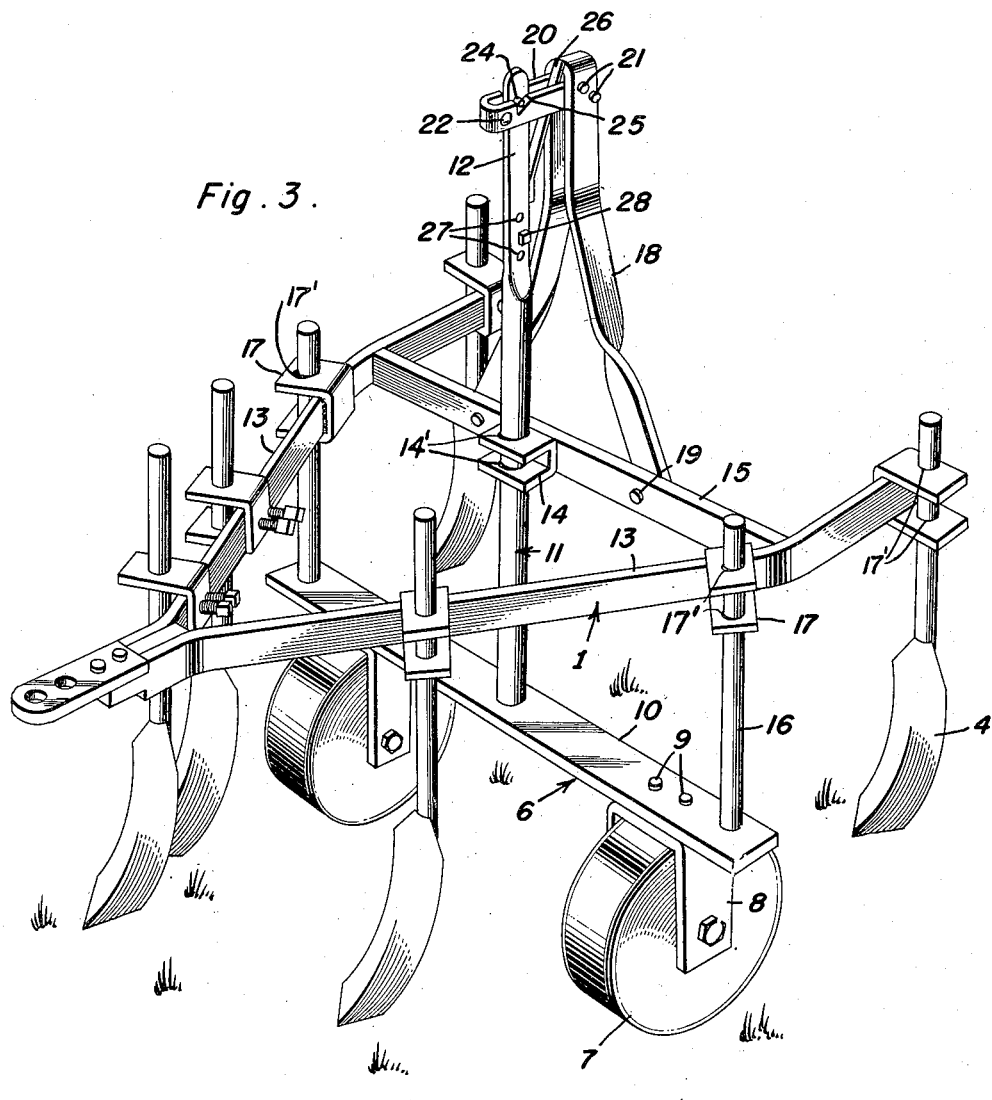
Figure 3 is a view in perspective of the cultivator implement carrying frame equipped according to my invention and detached from the tractor and drawn to a larger scale.

As shown in Figure 2, in the normal position of the parts, that is with the cultivator implement carrying frame 1 swung downwardly and the cultivator implements 4 in selected working position, the guide member 20 rests on the stop bolt 28 and said frame 1 is suspended by said member 20 and the hanger bar 18 on the center post 11 of the wheeled truck 6 but is free to ride up and down on said post. The locking cross pin 22 engages the front edge of the flattened end 12 of the center post 11 and prevents said post from tilting forwardly, and the leaf spring 26 is positioned above the upper end of the hanger bar 18 in ineffective position. When the cultivator implement carrying frame 1 is swung upwardly, for the purpose described, into substantially its limit of upward swinging movement, the leaf spring 26 wipingly and slidably engages the upper end of the hanger bar 18 and the stop pin 24 enters the notches 25, whereupon, under conjoint action of said spring and camming effect of said notches 25 against the stop pin 24, the center post 11 is tilted forwardly to enter the locking cross pin 22 in the locking notch 23, thereby automatically locking the cultivator implement carrying frame in upswung suspended position. To release said frame 1, it is merely necessary to raise the same slightly so as to lift the weight off the locking cross pin 22 and then, by a slight pull rearwardly on the center post 11, tilt said post rearwardly in the guide member 20 in opposition to the leaf spring 26 whereby to pull the locking notch 23 free of the locking cross pin 22, whereupon said frame 1 will descend under the influence of gravity until the cultivator implements 4 engage the ground.

The foregoing will, it is believed, suffice to impart a clear understanding of my invention, without further explanation.

Manifestly, the invention, as described, is susceptible of modification, without departing from the inventive concept and right is herein reserved to such modifications as fall within the scope of the appended claims.

Having described the invention, what is claimed as new is:

1. Mechanism of the class described comprising an implement carrying frame pivotally mounted for vertical swinging upwardly and downwardly to raise and lower the implements, a wheeled truck for supporting said frame in upswung position including an upright post, means for attaching said frame to said post for vertical sliding thereon during upward swinging thereof and in which said post is tiltable longitudinally of said frame, hanger means to suspend said frame from said post in upswung position including devices automatically locking said frame in upswung position upon tilting of the post in one direction, and tension means to tilt said post in said direction upon upward swinging of said frame.

2. Mechanism of the class described comprising an implement carrying frame pivotally mounted for vertical swinging upwardly and downwardly to raise and lower the implements, a wheeled truck for supporting said frame in upswung position including an upright post, means for attaching said frame to said post for vertical sliding thereon during upward swinging thereof and in which said post is tiltable longitudinally of said frame, hanger means to suspend said frame from said post in upswung position including devices automatically locking said frame in upswung position upon tilting of the post in one direction, and spring means to tilt said post in said direction upon upward swinging of said frame, said devices being operative to unlock said frame by manual tilting of said post in another direction whereby said frame may swing downwardly under the influence of gravity on said post.

3. Mechanism of the class described comprising an implement carrying frame pivotally mounted for vertical swinging upwardly and downwardly to raise and lower the implements, a wheeled truck for supporting said frame in upswung position including an upright post, means for attaching said frame to said post for vertical sliding thereon during upward swinging thereof and in which said post is tiltable longitudinally of said frame, hanger means to suspend said frame from said post in upswung position including devices automatically locking said frame in upswung position upon tilting of the post in one direction, and spring means to tilt said post in said direction upon upward swinging of said frame, said devices being operative to unlock said frame by manual tilting of said post in another direction whereby said frame may swing downwardly under the influence of gravity on said post, and means for variably limiting downward swinging of said frame.

4. Mechanism of the class described comprising an implement carrying frame pivotally mounted for vertical swinging upwardly and downwardly to raise and lower the implements, a wheeled truck for supporting said frame in upswung position including an upright post, means for attaching said frame to said post for vertical sliding thereon during upward swinging thereof and in which said post is tiltable longitudinally of said frame, hanger means to suspend said frame from said post in upswung position including devices automatically locking said frame in upswung position upon tilting of the post in one direction, and spring means to tilt said post in said direction upon upward swinging of said frame, said devices comprising a hanger bar on said frame, a guide member on said bar straddling said post and in which said post is vertically slidable and laterally tiltable, a locking pin on said member, said post having a notch therein for straddling said pin when said post is tilted in one direction.

5. Mechanism of the class described comprising an implement carrying frame pivotally mounted for vertical swinging upwardly and downwardly to raise and lower the implements, a wheeled truck for supporting said frame in upswung position including an upright post, means for attaching said frame to said post for vertical sliding thereon during upward swinging thereof and in which said post is tiltable longitudinally of said frame, means to suspend said frame from said post in upswung position including devices automatically locking said frame in upswung position upon tilting of the post in one direction, and means to tilt said post in said direction upon upward swinging of said frame, said devices comprising a hanger bar on said frame, a guide member on said bar straddling said post and in which said post is vertically slidable and laterally tiltable, a locking pin on said member, said post having a notch therein for straddling said pin when said post is tilted in one direction, said last means comprising pin and cam notch devices on said post and guide member respectively coacting to cam said post into tilted position.

6. Mechanism of the class described comprising an implement carrying frame pivotally mounted for vertical swinging upwardly and downwardly to raise and lower the implements, a wheeled truck for supporting said frame in upswung position including an upright post, means for attaching said frame to said post for vertical sliding thereon during upward swinging thereof and in which said post is tiltable longitudinally of said frame, means to suspend said frame from said post in upswung position including devices automatically locking said frame in upswung position upon tilting of the post in one direction, and means to tilt said post in said direction upon upward swinging of said frame, said devices comprising a hanger bar on said frame, a guide member on said bar straddling said post and in which said post is vertically slidable and laterally tiltable, a locking pin on said member, said post having a notch therein for straddling said pin when said post is tilted in one direction, said last means comprising a spring on said post slidably engaged with said bar by upward swinging of said frame to tilt said post.

CHARLES F. O'BRIEN.

REFERENCES CITED

The following references are of record in the file of this patent:

UNITED STATES PATENTS

| Number | Name | Date |
|---|---|---|
| 1,034,624 | Kindl | Aug. 6, 1912 |
| 1,089,213 | Hallbauer | Mar. 3, 1914 |
| 1,376,591 | Towle | May 3, 1921 |
| 2,260,344 | Shaw | Oct. 28, 1941 |